US012709559B2

(12) United States Patent
Kim et al.

(10) Patent No.: US 12,709,559 B2
(45) Date of Patent: Aug. 18, 2026

(54) WATER TREATMENT DEVICE

(71) Applicant: LG ELECTRONICS INC., Seoul (KR)

(72) Inventors: Younsu Kim, Seoul (KR); Byungsoo Oh, Seoul (KR); Mynghee Jung, Seoul (KR); Myeongsoo Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 387 days.

(21) Appl. No.: 17/670,063

(22) Filed: Feb. 11, 2022

(65) Prior Publication Data

US 2023/0080847 A1 Mar. 16, 2023

(30) Foreign Application Priority Data

Sep. 3, 2021 (KR) ........................ 10-2021-0117956

(51) Int. Cl.
*C02F 1/467* (2023.01)
*C02F 1/00* (2023.01)
(Continued)

(52) U.S. Cl.
CPC ............ *C02F 1/4674* (2013.01); *C02F 1/008* (2013.01); *C02F 1/4602* (2013.01);
(Continued)

(58) Field of Classification Search
CPC ....................... C02F 1/4674; C02F 2201/4613
See application file for complete search history.

(56) References Cited

U.S. PATENT DOCUMENTS 5,807,473 A * 9/1998 Sadler ................. C02F 1/46104 205/744
6,585,867 B1 * 7/2003 Asano .................. C02F 1/4618 204/660
(Continued)

FOREIGN PATENT DOCUMENTS

JP 1997-79280 A † 3/1994
JP 10-500614 A 1/1998
(Continued)

*Primary Examiner* — Stefanie S Wittenberg
(74) *Attorney, Agent, or Firm* — Birch, Stewart, Kolasch & Birch, LLP

(57) ABSTRACT

Disclosed is a water treatment device such as a water purifier. In particular, a water treatment device capable of producing sterilizing water is disclosed. The device includes a sterilizing water producing module for electrolyzing raw water to produce sterilizing water, wherein the sterilizing water producing module includes a plurality of first electrodes and a plurality of second electrodes arranged alternately with each other and spaced from each other, wherein the first and second electrodes have opposite polarities to each other, wherein a polarity of each of the first electrode and the second electrode is switchable to between a positive potential and a negative potential, such that the sterilizing water producing module operates such that a positive potential operation and a negative potential operation are alternately repeated, wherein a magnitude of voltage or current applied to the sterilizing water producing module under the negative potential operation is smaller than a magnitude of voltage or current applied to the module under the positive potential operation.

9 Claims, 16 Drawing Sheets

(51) Int. Cl.
*C02F 1/46* (2023.01)
*C02F 1/461* (2023.01)

(52) U.S. Cl.
CPC ..................... *C02F 1/46109* (2013.01); *C02F 2001/46119* (2013.01); *C02F 2001/46142* (2013.01); *C02F 2201/4611* (2013.01); *C02F 2201/4613* (2013.01); *C02F 2201/46135* (2013.01); *C02F 2201/4614* (2013.01); *C02F 2201/46145* (2013.01); *C02F 2201/4615* (2013.01); *C02F 2201/46175* (2013.01); *C02F 2301/04* (2013.01); *C02F 2303/04* (2013.01)

(56) References Cited

U.S. PATENT DOCUMENTS

2013/0342028 A1* 12/2013 Hermann ............ C02F 1/46104
307/109
2018/0186671 A1* 7/2018 Perez ...................... C02F 1/008

FOREIGN PATENT DOCUMENTS

| | | | | | |
|---|---|---|---|---|---|
| JP | 10-85746 | A | | 4/1999 | |
| KR | 10-0623672 | B1 | | 9/2006 | |
| KR | 20130009329 | B1 | * | 1/2013 | .............. C02F 1/467 |
| KR | 10-1293233 | B1 | | 8/2013 | |
| KR | 10-2017-0069987 | A | † | 6/2017 | |
| KR | 20170107642 | A | * | 9/2017 | ............ C02F 1/4674 |
| KR | 10-1812008 | B1 | | 12/2017 | |
| KR | 10-2265478 | B1 | † | 6/2021 | |
| WO | WO-2022164723 | A1 | * | 8/2022 | ............ C02F 1/4674 |

* cited by examiner
† cited by third party

WATER TREATMENT DEVICE

This application claims the benefit of Korean Patent Application No. 10-2021-0117956, filed on Sep. 3, 2021, which is hereby incorporated by reference as when fully set forth herein.

BACKGROUND OF THE DISCLOSURE

Field of the Disclosure

The present disclosure relates to a water treatment device such as a water purifier, and in particular, to a water treatment device capable of producing sterilizing water.

Discussion of the Related Art

In general, a water treatment device for producing purified water by treating raw water such as a water purifier has been disclosed in various modern forms. However, among schemes applied to the water treatment device, a scheme that has recently been spotlighted is a deionization method such as EDI (Electro Deionization), CEDI (Continuous Electro Deionization), and CDI (Capacitive Deionization). In this connection, the CDI-type water treatment device has recently been in the spotlight.

The CDI scheme refers to a scheme that removes ions (scale) in water using the principle that ions are adsorbed onto and desorbed from an electrode surface via electrical force.

When treatment target water containing ions passes through between a positive electrode and a negative electrode while voltage is applied to the electrodes, anion moves to the positive electrode while cation moves to the negative electrode. That is, adsorption takes place. The ions in the treatment target water may be removed with the adsorption.

However, the adsorption continues, and thus the electrode reaches a state in which the electrode may no longer adsorb the ions. In this state, the ions adsorbed to the electrode are separated therefrom to regenerate the electrode. In this connection, washing water containing the ions separated from the electrode is discharged to an outside. Such reproducing may be accomplished by not applying a voltage to the electrode, or by applying voltages having polarities opposite to those used in the adsorbing operation.

Although scale formation may be prevented through the electrode polarity switching operation as described above, the polarity switching operation process may cause electrode damage due to a process in which a high potential is repeatedly switched. Accordingly, a lifetime of a metal constituting the electrode may be shortened.

In other words, when the polarity switching operation is performed to remove the scale, oxidation and reduction of an electrode metal layer are repeated, thereby causing damage to and thus shortening a life of a catalyst electrode.

Further, in the descaling process, the scale material is adsorbed to the opposite electrode again, thereby reducing the efficiency of the descaling.

Therefore, a solution for solving these problems is required.

SUMMARY OF THE DISCLOSURE

The present disclosure is intended to solve the problems. Thus, a purpose of the present disclosure is to provide a water treatment device that may prevent scale build-up in electrolysis of feed water to produce sterilizing water.

Further, a purpose of the present disclosure is to provide a water treatment device that may remove scale in electrolysis of feed water to produce sterilizing water, and at the same time, prevent deterioration of the electrode life Further, a purpose of the present disclosure is to provide a water treatment device that may keep a concentration of hypochlorous acid constituting sterilizing water constant.

According to an embodiment of the present disclosure, the water treatment device having a sterilizing water producing function may prevent the formation of the scale, and at the same time, may prevent a decrease in the lifetime of the electrode.

In other words, controlling a magnitude of a polarity-switched current or voltage, a frequency, and a duration of the polarity switching may allow the polarity switching of the electrodes to induce desorption of a hardness material such as magnesium and a scale-inducing material such as calcium from the negative electrode surface, thereby preventing the scale formation on the electrode surface, and preventing the electrode damage caused by the polarity switching (larger number of repetitions of oxidation and reduction.

A first aspect of the present disclosure provides a water treatment device having a sterilizing water producing function, the device comprising: a sterilizing water producing module for electrolyzing raw water to produce sterilizing water, wherein the sterilizing water producing module includes a plurality of first electrodes and a plurality of second electrodes arranged alternately with each other and spaced from each other, wherein the first and second electrodes have opposite polarities to each other, wherein a polarity of each of the first electrode and the second electrode is switchable to between a positive potential and a negative potential, such that the sterilizing water producing module operates such that a positive potential operation and a negative potential operation are alternately repeated, wherein a magnitude of voltage or current applied to the sterilizing water producing module under the negative potential operation is smaller than a magnitude of voltage or current applied to the module under the positive potential operation.

In one implementation of the first aspect, the device further comprises a controller configured to apply voltage or current to the first electrode and the second electrode of the sterilizing water producing module to operate the module.

In one implementation of the first aspect, the device further comprises a bypass path bypassing the sterilizing water producing module.

In one implementation of the first aspect, a time duration of the negative potential operation is shorter than a time duration of the positive potential operation.

In one implementation of the first aspect, the sterilizing water is produced under the positive potential operation, wherein at least one of scale removal or washing is performed under the negative potential operation.

In one implementation of the first aspect, the voltage or current is applied in a pulse manner under the negative potential operation.

In one implementation of the first aspect, an idle period is present between the positive potential operation and the negative potential operation.

In one implementation of the first aspect, a first idle period is present before the negative potential operation and a second idle period is present after the negative potential operation.

In one implementation of the first aspect, washing of the first electrode and the second electrode is performed for the idle period.

In one implementation of the first aspect, at least one of the first electrode or the second electrode includes: a substrate metal layer; and a catalyst metal layer.

In one implementation of the first aspect, the catalyst metal layer includes at least one of Ru, Ir, Pt, Pd, Rh, or an oxide thereof.

In one implementation of the first aspect, the catalyst metal layer includes at least one of Ta, Pt, Sn, Ti, or an oxide thereof.

In one implementation of the first aspect, the substrate metal layer includes at least any of Ti, Ta, or an oxide thereof, or at least one of stainless steel (SUS) or Pt.

In one implementation of the first aspect, the second electrode is composed only of the substrate metal layer.

A second aspect of the present disclosure provides a water treatment device having a sterilizing water producing function, the device comprising: a sterilizing water producing module for electrolyzing raw water to produce sterilizing water, wherein the sterilizing water producing module includes a plurality of first electrodes and a plurality of second electrodes arranged alternately with each other and spaced from each other, wherein the first and second electrodes have opposite polarities to each other; a bypass path bypassing the sterilizing water producing module; and a controller configured to operate the sterilizing water producing module, wherein the controller is configured to switch a polarity of each of the first electrode and the second electrode to between a positive potential and a negative potential to operate the sterilizing water producing module such that a positive potential operation and a negative potential operation are alternately repeated, wherein the sterilizing water is produced under the positive potential operation, wherein at least one of scale removal or washing is performed under the negative potential operation.

In one implementation of the second aspect, a magnitude of voltage or current applied to the sterilizing water producing module under the negative potential operation is smaller than a magnitude of voltage or current applied to the module under the positive potential operation.

DESCRIPTION OF SPECIFIC EMBODIMENTS

Hereinafter, the embodiments disclosed in the present specification will be described in detail with reference to the accompanying drawings. The same reference numbers may be allocated to the same or similar components are given. Redundant descriptions thereof will be omitted. As used herein, a suffix "module" or "unit" as used for a component are intended only for ease of writing the present disclosure, and the suffix "module" or "unit" itself does not have a specific meaning or role. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Further, the features of the various embodiments of the present disclosure may be partially or entirely combined with each other, and may be technically associated with each other or operate with each other. The embodiments may be implemented independently of each other and may be implemented together in an association relationship In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to" or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Figure 1:
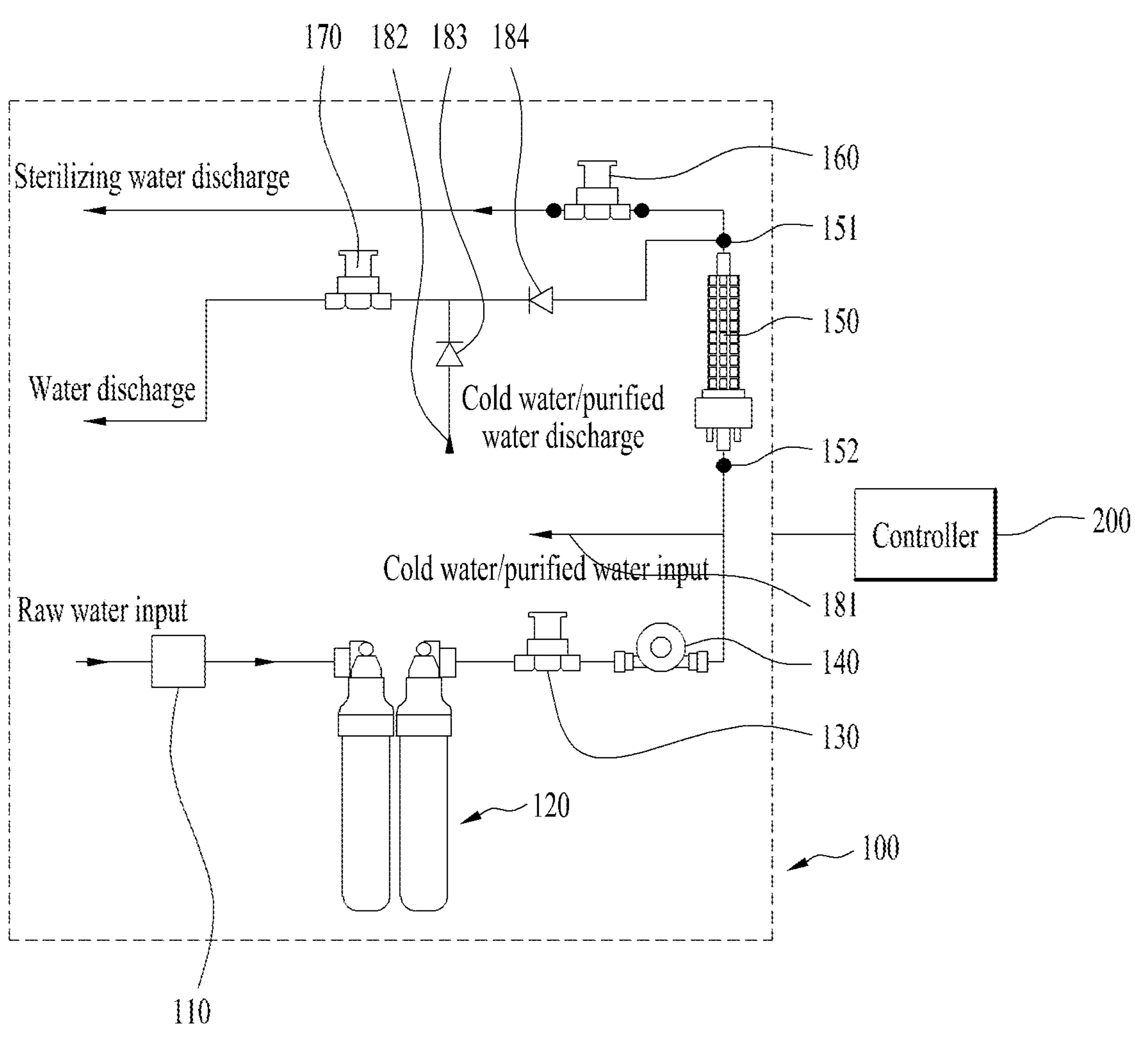
FIG. 1 is a schematic diagram showing a water treatment device according to one embodiment of the present disclosure.
Figure 2:
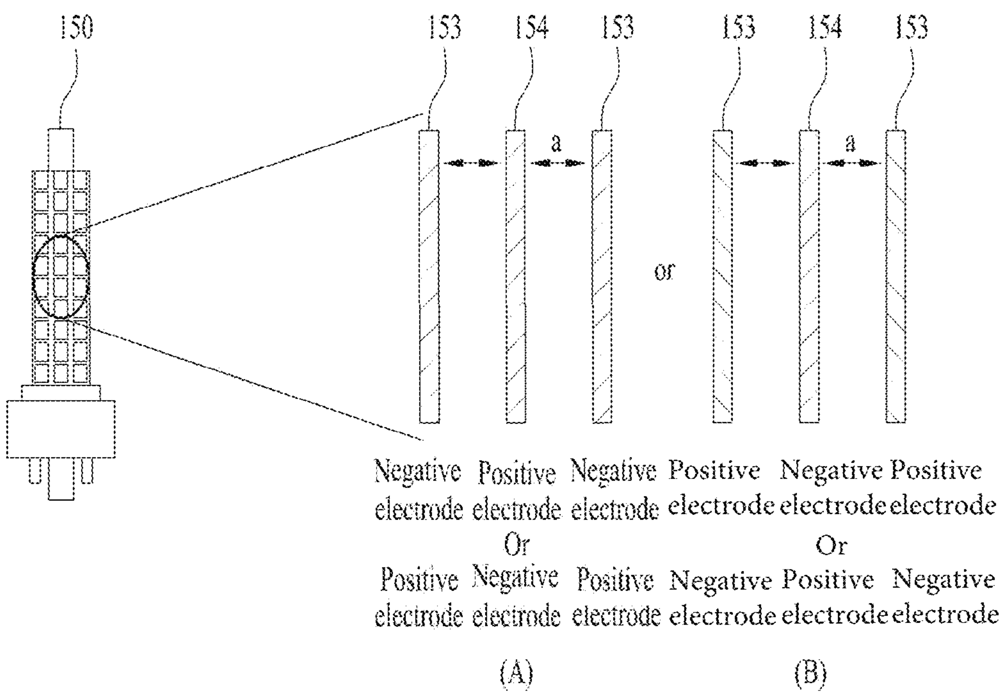
FIG. 2 is a conceptual diagram showing a sterilizing water producing module provided in the water treatment device according to one embodiment of the present disclosure.

FIG. 1 is a schematic diagram showing a water treatment device according to one embodiment of the present disclosure. FIG. 2 is a conceptual diagram showing a sterilizing water producing module provided in a water treatment device according to one embodiment of the present disclosure.

The water treatment device according to the present disclosure may act as various purification devices such as a water purifier, a water softener, and the like. Further, the water treatment device according to the present disclosure may act as purification means installed in a washing machine, a dish washing machine, a refrigerator, etc. The water treatment device according to the present disclosure may produce sterilizing water.

Hereinafter, an example in which the water treatment device is embodied as a water purifier will be described. However, the scope of the present disclosure is not limited thereto. Various embodiments may be made as long as the water treatment device electro-adsorbs the ions contained in raw water introduced from an outside and then discharges the treated water.

Referring to FIG. 1, the water treatment device according to the present disclosure may act as a water purifier in one example.

A water purifier 100 may be configured for purifying water (raw water) directly supplied from an external water supply source and then discharging the purified water out.

This water purifier 100 may include a sterilizing water producing module 150. This sterilizing water producing module 150 may produce sterilizing water by electrolyzing the raw water. That is, when the raw water is electrolyzed, hypochlorous acid may be produced and may be present in a form of HOCl and $OCl^-$.

Referring to FIG. 2, for sterilizing water producing, the sterilizing water producing module 150 may include a plurality of first electrodes 153 and a plurality of second electrodes 154 having opposite polarities and alternately arranged with each other and adjacent to each other.

In one example, a pair of the first electrode 153 and the second electrode 154 may include a plurality of pairs. In some cases, at least a part of the first electrodes 153 may not constitute the pair but may be present alone, and/or at least a part of the second electrodes 154 may not constitute the pair but may be present alone.

Each of the polarities of the first electrode 153 and the second electrode 154 of the sterilizing water producing module 150 may be switchable to between a positive potential and a negative potential. In one example, in a first cycle of an operation of the sterilizing water producing module 150, the first electrode 153 may act as a negative electrode and the second electrode 154 may act as a positive electrode. In a second cycle performed thereafter, the first electrode 153 may act as a positive electrode and the second electrode 154 may act as a negative electrode.

In one example, a potential state in which the first electrode 153 acts as a negative electrode and the second electrode 154 acts as a positive electrode may be referred to as a positive potential operation. Conversely, a potential state in which the first electrode 153 acts as a positive electrode and the second electrode 154 acts as a negative electrode may be referred to as a negative potential operation. However, the present disclosure is not limited thereto. In another example, a potential state in which the first electrode 153 acts as a negative electrode and the second electrode 154 acts as a positive electrode may be referred to as a negative potential operation. Conversely, a potential state in which the first electrode 153 acts as a positive electrode and the second electrode 154 acts as a negative electrode may be referred to as a positive potential operation.

In this way, the sterilizing water producing module 150 may operate such that the positive potential operation and the negative potential operation may be alternately repeated. In this connection, in one example, the sterilizing water may be produced in both the positive potential operation and the negative potential operation. This may be referred to as a symmetric potential operation. (A) in FIG. 2 shows a state of this symmetric potential operation.

In such a symmetric potential operation, the first electrode 153 and the second electrode 154 may have the same structure. In one example, each of the first electrode 153 and the second electrode 154 may have a catalyst layer for sterilizing water producing.

In another example, the sterilizing water may be produced only in one of the positive potential operation and the negative potential operation. This may be referred to as an asymmetric potential operation. (B) in FIG. 2 shows the state of this asymmetric potential operation.

In such asymmetric potential operation, the first electrode 153 and the second electrode 154 may have different structures. In one example, one of the first electrode 153 and the second electrode 154 may not include a catalyst layer for sterilizing water producing.

Figure 3:
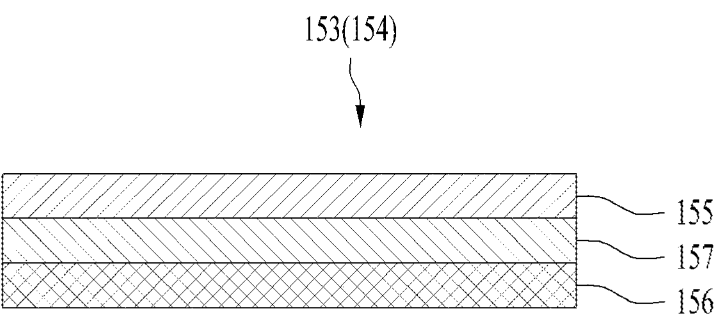
FIG. 3 is a cross-sectional schematic diagram showing an electrode structure of the water treatment device according to one embodiment of the present disclosure.

FIG. 3 is a cross-sectional schematic diagram showing an electrode structure of the water treatment device according to one embodiment of the present disclosure.

Referring to FIG. 3, at least one of the first electrode 153 or the second electrode 154 may include a substrate metal layer 156 and a catalyst metal layer 155.

In a first example, the catalyst metal layer 155 may include at least one of Ru, Ir, Pt, Pd, or Rh, or an oxide thereof.

In a second example, the catalyst metal layer 155 may include at least one of Ta, Pt, Sn, or Ti, or an oxide thereof.

In another example, the first and second examples may be interchangeable with each other.

Further, the substrate metal layer 156 may include at least one of Ti or Ta, or an oxide thereof, or at least one of SUS or Pt.

As shown in FIG. 3, a protective layer 157 may be disposed between the substrate metal layer 156 and the catalyst metal layer 155.

As described above, the first electrode 153 and the second electrode 154 may have different structures in the asymmetric potential operation. In one example, the first electrode 153 may have the electrode structure shown in FIG. 3, and the second electrode 154 may be composed only of the substrate metal layer 156.

In such an asymmetric electrode structure, an amount of produced chlorine for producing of the sterilizing water may be smaller in the negative potential operation. That is, only a small amount of chlorine may be produced from the negative electrode in the negative potential operation. The negative potential operation may have a main purpose of scale removal. Further, a magnitude of voltage or current applied in the negative potential operation may be smaller than a magnitude of voltage or current in the positive potential operation.

Table 1 shows operations occurring at the positive and negative electrodes in the symmetric potential operation. In addition, the operations occurring at the positive and negative electrodes in the asymmetric potential operation are shown in Table 2.

TABLE 1

| | Positive potential | | Reverse potential | |
|---|---|---|---|---|
| Negative electrode | Hydrogen producing | Scale adsorption | Sterilizing water producing | Scale desorption |
| Positive electrode | Sterilizing water producing | Scale desorption | Hydrogen producing | Scale adsorption |

TABLE 2

| | Positive potential | | Reverse potential | |
|---|---|---|---|---|
| Negative electrode | Hydrogen producing | Scale adsorption | Trace of chlorine producing | Scale desorption |
| Positive electrode | Sterilizing water producing | Scale desorption | Hydrogen producing | Scale adsorption |

In one example, electrolysis may be performed between the first electrode 153 and the second electrode 154 in the sterilizing water producing. In this connection, an oxidation process may occur at the first electrode 153 and a reduction process may occur at the second electrode 154.

In this connection, when the first electrode 153 acts as a negative electrode, a reaction such as "$2Cl^- \rightarrow Cl_2 + 2e^-$" may occur at the first electrode 153. When the second electrode 153 acts as a positive electrode, a reaction such as "$2H_2O + 2e^- \rightarrow H_2 + 2OH^-$" may occur thereat.

Details of such sterilizing water producing will be described later.

Referring back to FIG. 1, the water purifier 100 may include a filter that filters foreign materials contained in the raw water supplied from the water supply source. Such a filter may be provided in a form of the filter assembly 120. The filter assembly 120 may include a carbon filter.

The raw water may be fed into the sterilizing water producing module 150 through the filter assembly 120. For the sterilizing water producing, the filter assembly 120 may be optionally provided. This filter assembly 120 may be referred to as a pre-treatment filter.

In particular, the filter assembly 120 may be provided when the water treatment device according to the embodiment of the present disclosure is implemented as a water purifier.

In one example, the filter assembly 120 may include at least one of a sedimentation filter, a pre-treatment carbon filter, a hollow fiber membrane filter, or a reverse osmosis filter (R/O membrane filter).

In this connection, the sedimentation filter may be an early stage filter that removes impurities such as rust, soil, sand, and dust. The pre-treatment carbon filter may be a filter that adsorbs and removes chemical materials and odors via adsorption using activated carbon. The hollow fiber membrane filter may be a filter that filters out bacteria and bad materials and allows water containing mineral components to pass therethrough. The reverse osmosis filter may remove impurities and minerals.

Although not shown, in some cases, a post-treatment filter may be further provided at a rear end of the sterilizing water producing module 150 or at bypass paths 181 and 182. Such a post-treatment filter may be optionally provided. The post-treatment filter may be provided in particular when the water treatment device according to an embodiment of the present disclosure is implemented as a water purifier.

The post-treatment filter may include a post-treatment carbon filter (post carbon). This post-treatment carbon filter may serve to prevent bacterial growth and remove odors from the water.

A pressure reducing valve 110 may be disposed between a raw water inlet and the filter assembly 120 for reducing a pressure of the input raw water and supplying the depressed raw water to the filter assembly 120.

Downstream of the filter assembly 120, a water supply valve 130 may be located. Thus, the raw water may be introduced via an operation of the water supply valve 130. A flow rate sensor 140 may be provided next to the water supply valve 130 to detect an amount of water passing through the water supply valve 130.

The sterilizing water producing module 150 may be connected to and disposed between a first point 151 and a second point 152 and at a rear end of the water supply valve 130.

Cold water/purified water passing through the filter assembly 120 may be input to and then discharged out of the bypass paths 181 and 182. The cold water/purified water passing through the filter assembly 120 may bypass the sterilizing water producing module via the bypass paths 181 and 182.

In this connection, although not shown, a separate water tank may be located in each of the bypass paths 181 and 182.

The bypassed cold water/purified water may be discharged from separate water outlets 183 and 184.

In one example, each of the bypass paths 181 and 182 may have a drain valve 170 so that scale-causing material (ions) adsorbed on the first electrode 153 and the second electrode 154 may be drained wider an operation thereof.

A water discharge valve 160 for discharging THE sterilizing water may be provided at A rear end of the sterilizing water producing module 150.

At least one of the valves 110, 130, 160, or 170, the flow rate sensor 140 or the sterilizing water producing module 150 may be controlled by the controller 200.

In particular, the operation of the sterilizing water producing module 150 via the application of voltage and current to the first electrode 153 and the second electrode 154 of the sterilizing water producing module 150 may be performed by the controller 200.

That is, the controller 200 may apply the voltage or current to the first electrode 153 and the second electrode 154 of the sterilizing water producing module 150 to perform the positive potential operation or the negative potential operation.

In the operation of the sterilizing water producing module 150, scale-inducing materials ($Ca^{2+}$, $Mg^{2+}$, etc.) contained at a larger amount in the raw water may be adsorbed to the first electrode 153 and the second electrode 154. In this connection, the ions adsorbed under the negative potential operation may be discharged through the drain valve 170.

Figure 4:
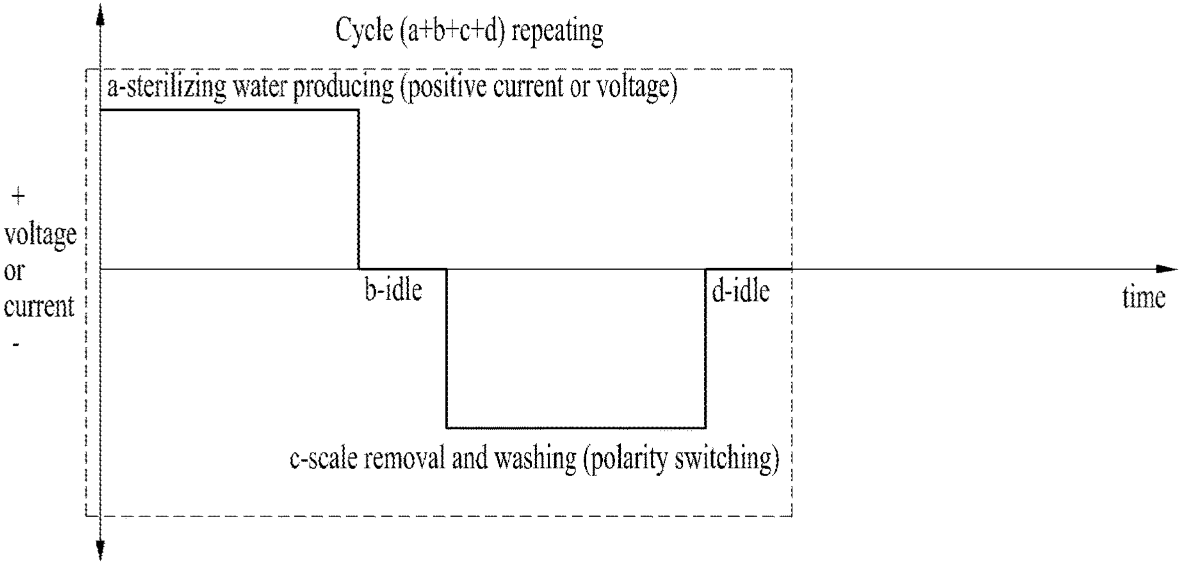
FIG. 4 is a waveform diagram showing an operation state of the sterilizing water producing module of the water treatment device according to one embodiment of the present disclosure.
Figure 5:
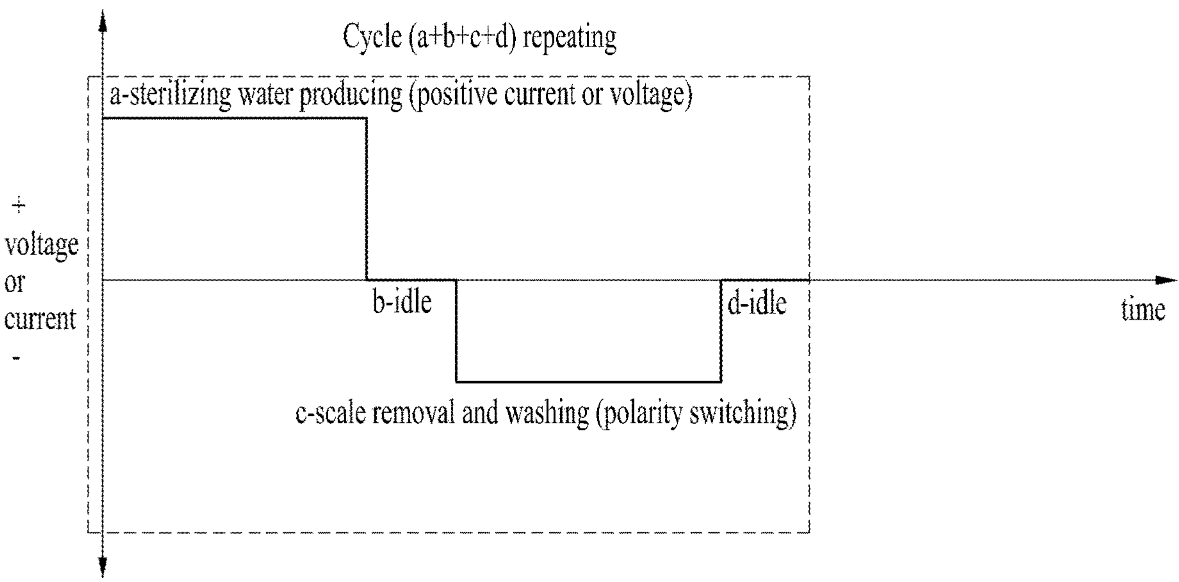
FIG. 5 is a waveform diagram showing an operation state of the sterilizing water producing module of the water treatment device according to another embodiment of the present disclosure.
Figure 6:
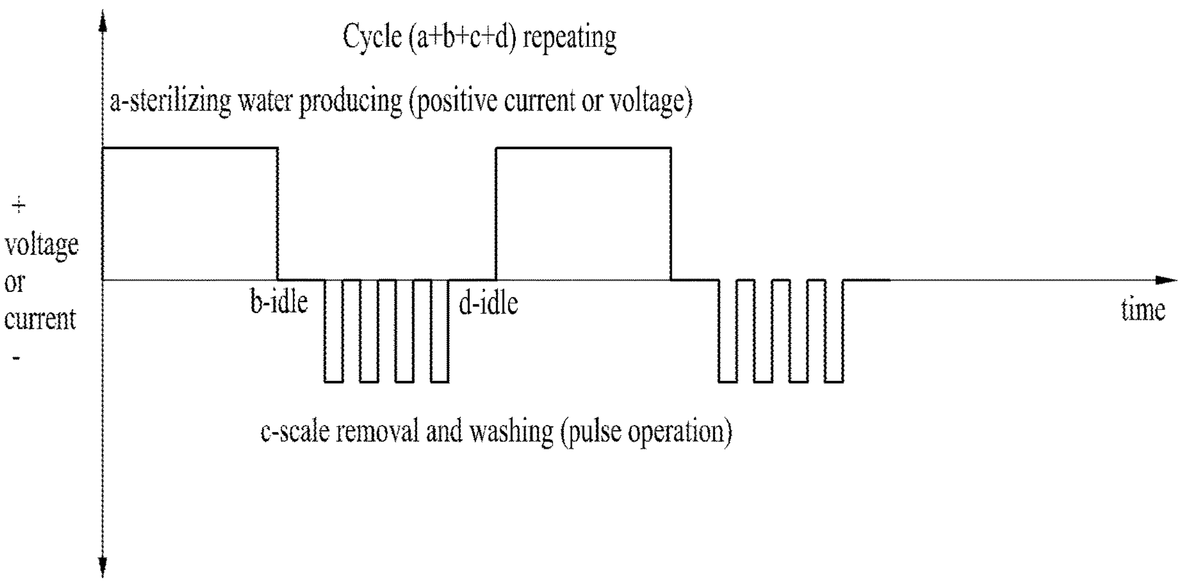
FIG. 6 is a waveform diagram showing an operation state of the sterilizing water producing module of the water treatment device according to still another embodiment of the present disclosure.

FIG. 4 is a waveform diagram showing an operation state of the sterilizing water producing module of the water treatment device according to one embodiment of the present disclosure. FIG. 5 is a waveform diagram showing an operation state of the sterilizing water producing module of the water treatment device according to another embodiment of the present disclosure. FIG. 6 is a waveform diagram showing an operation state of the sterilizing water producing module of the water treatment device according to still another embodiment of the present disclosure.

Referring to FIG. 4, in the operation of the sterilizing water producing module 150, (a) sterilizing water producing under a first polarity-based operation, and (c) scale removal and washing process under a second polarity-based operation via polarity switching may be repeated. In one example, the first polarity-based operation may be the positive potential operation as described above, and the second polarity-based operation may be the negative potential operation as described above.

In this way, in the operation of the sterilizing water producing module 150, each of the polarities of the first electrode 153 and the second electrode 154 may be switchable to between the positive potential and the negative potential. The sterilizing water producing module 150 may operate such that the positive potential operation and the negative potential operation may be alternately repeated.

In this connection, (b) an idle period may be located between (a) and (c), and (d) an idle period may be located after (c). That is, current or voltage may not be applied to the first electrode 153 and the second electrode 154 in (b) and (d) the idle periods.

In (b) and (d) the idle periods, the washing process of the first electrode 153 and the second electrode 154 may be performed. In one example, in (b) and (d) the idle periods, a washing process of the first electrode 153 and the second electrode 154 and a standby process for which no current or voltage is applied may be performed together.

In one example, the negative potential operation (c) time duration may be shorter than the positive potential operation (a) time duration.

In one example, referring to FIG. 5, in the operation of the sterilizing water producing module 150, (a) sterilizing water producing under a first polarity-based operation, and (c) scale removal and washing process under a second polarity-based operation via polarity switching may be repeated. In one example, the first polarity-based operation may be the positive potential operation as described above, and the second polarity-based operation may be the negative potential operation as described above.

In this connection, the magnitude of the voltage or current applied in (c) the negative potential operation may be smaller than the magnitude of the voltage or current applied in (a) the positive potential operation.

In (c) this negative potential operation, an amount of produced chlorine for sterilizing water producing may be smaller. That is, only a small amount of chlorine may be produced from the negative electrode in the negative potential operation. The negative potential operation may have the main purpose of the scale removal.

Referring to FIG. 6, in (c) the negative potential operation may be implemented in a form of a pulse. That is, voltage or current may be applied to the first electrode 153 and the second electrode 154 in a pulse form in (c) the negative potential operation.

Further, the magnitude of the voltage or current applied in (c) the negative potential operation may be smaller than the magnitude of the voltage or current applied in (a) the positive potential operation.

According to this embodiment of the present disclosure, the device may prevent the formation of the scale on the negative electrode surface in electrolysis of the raw water for production hypochlorous acid water (sterilizing water).

In other words, the polarity switching may reverse the direction of the electrical field such that the scale-inducing ions (Ca, Mg, etc.) adsorbed on the negative electrode when producing sterilizing water may be removed via desorption and running water.

In general, tap water contains chlorine ions and hardness materials of calcium and magnesium. While the sterilizing water may be produced via electrolysis of the tap water, the scale precipitation proceeds, and thus the electrochemical reaction in the catalyst metal layer 155 may be prohibited.

Although the scale formation may be prevented via the electrode polarity switching operation, the polarity switching operation may cause the electrode damage due to the repeated switching of high potential. Therefore, the lifetime of the catalyst metal layer 155 may be shortened.

In other words, when the polarity switching operation is performed to remove scale, oxidation and reduction of the catalyst metal layer 155 may be repeated, thereby causing damage to and shortening the life of the catalyst electrode.

However, according to the embodiment of the present disclosure, the damage to the catalyst electrode due to the polarity switching may be suppressed by adjusting the intensity of the operating current or voltage in the polarity switching, and a period, and a duration of the polarity switching.

Thus, according to the embodiment of the present disclosure, the scale may be prevented in the electrolysis of the feed water to generate the sterilizing water, such that the lifespan of the catalyst electrode may be increased.

Figure 7:
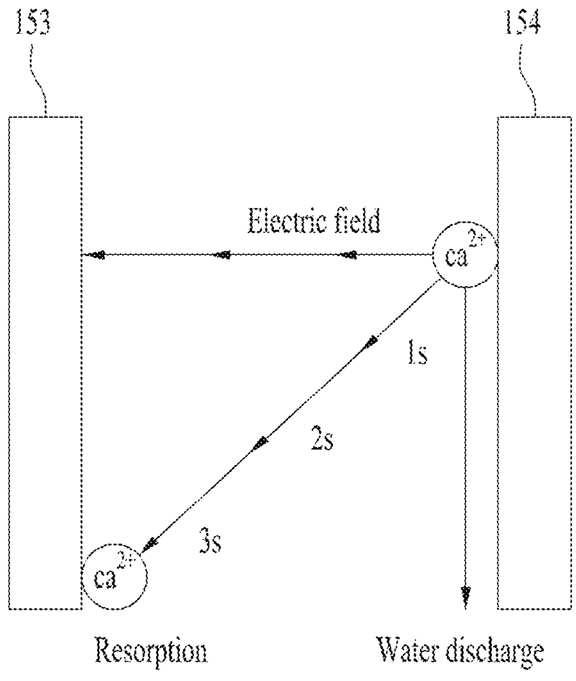
FIG. 7 is a schematic diagram showing an effect resulting from an operation of the sterilizing water producing module of the water treatment device according to conventional polarity switching.
Figure 8:
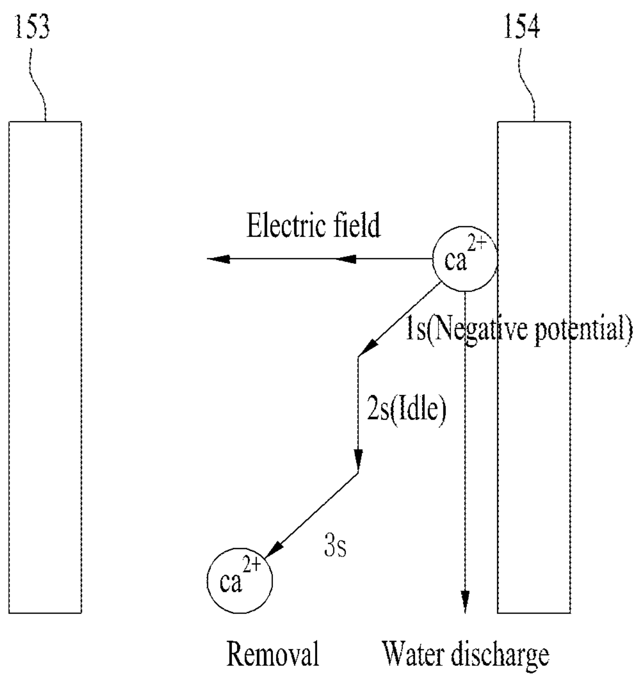
FIG. 8 is a schematic diagram showing an effect resulting from an operation of the sterilizing water producing module of the water treatment device according to one embodiment of the present disclosure.

FIG. 7 is a schematic diagram showing an effect of an operation of the sterilizing water producing module of the water treatment device according to conventional polarity switching. FIG. 8 is a schematic diagram showing an effect resulting from an operation of the sterilizing water producing module of the water treatment device according to one embodiment of the present disclosure.

Hereinafter, with reference to FIG. 7 and FIG. 8, the effect of the sterilizing water producing module of the water treatment device according to one embodiment of the present disclosure will be described in more detail.

First, the operation of the sterilizing water producing module of the water treatment device according to the conventional polarity conversion as shown in FIG. 7 is described.

When a positive potential is applied to the sterilizing water producing module, a sterilizing water producing operation may be performed.

In this connection, the hardness material may be present in an ionic state, and may move to the surface of the negative electrode (in this case, the second electrode 154) and may be adsorbed thereon via the electric field caused by the potential in the operation.

Hydrogen may be produced on the surface of the negative electrode, and thus, the adsorption of the hardness material (e.g., $Ca^{2+}$ ions) may be inhibited.

In this connection, the stronger the potential, the greater the moving force of the hardness material, whereas the producing of hydrogen may also increase.

In one example, when the polarity is switched such that the negative potential is applied to the sterilizing water producing module, the sterilizing water producing operation may be performed. That is, the same reaction as that when the positive potential is applied thereto may proceed.

Due to the strong electric field and the duration thereof, a moving force by which the existing hardness ions desorbed from the negative electrode (the second electrode 154) may move to the surface of the first electrode 153 as the opposite electrode may be greater so that the hardness ions may be re-adsorbed on the surface of the first electrode 153 as the opposite electrode. Thus, the hardness material may not be removed and may accumulate thereon. Further, because there is no idle period for the operation duration, the hardness material (in one example, $Ca^{2+}$ ions) may continuously migrate to the opposite electrode, that is, the first electrode 153, and be re-adsorbed thereon.

In this connection, the negative potential having the same magnitude as that of the positive potential may be applied to the electrode in the negative potential operation, such that the electrode damage may occur due to the increase in the oxidation-reduction amount.

Next, the process of the operation of the sterilizing water producing module of the water treatment device according to one embodiment of the present disclosure shown in FIG. 8 will be described.

When a positive potential is applied to the module, the sterilizing water producing operation may be performed in the same way as in the conventional case in FIG. 7.

That is, when the positive potential is applied to the sterilizing water producing module, a sterilizing water producing operation may be performed.

In this connection, the hardness material may be present in an ionic state, and may move to the surface of the negative electrode (in this case, the second electrode 154) and may be adsorbed thereon via the electric field caused by the potential in the operation.

Hydrogen may be produced on the surface of the negative electrode, that is, the second electrode 154, and thus, the adsorption of the hardness material (e.g., $Ca^{2+}$ ions) may be inhibited.

In this connection, the stronger the potential, the greater the moving force of the hardness material, whereas the producing of hydrogen may also increase Further, the polarity is switched to the negative potential. Thus, the same reaction as that when the positive potential is applied may proceed. However, depending on a type of an electrode material, the sterilizing water producing by the reaction may be very small.

The existing hardness ions are desorbed from the negative electrode, that is, the second electrode 154. The movement force of the hardness material to the surface of the counter electrode may be reduced due to a weak electric field due to a relatively weak potential and a short duration there. Therefore, the phenomenon of the re-adsorption of the hardness material (e.g., $Ca^{2+}$ ions) onto the counter electrode, that is, the first electrode 153 may be prevented. In this case, the duration of the operation may be shorter due to the idle period. Therefore, the re-adsorption of the hardness ions may be minimized.

Due to this weak negative potential and the short duration thereof, the electrode damage may be minimized.

In the pulse-type negative potential operation, the amount of ions removed by flowing water may be increased because the electric field by which the ions desorbed on the negative electrode surface move to the counter electrode works in a pulse manner.

Further, in the pulse-type operation, a total amount of applied potential decreases due to a time delay between the operation and actual application. This may reduce a total operation time of the negative potential operation and the magnitude of the negative potential, thereby reducing the electrode damage.

Figure 9:
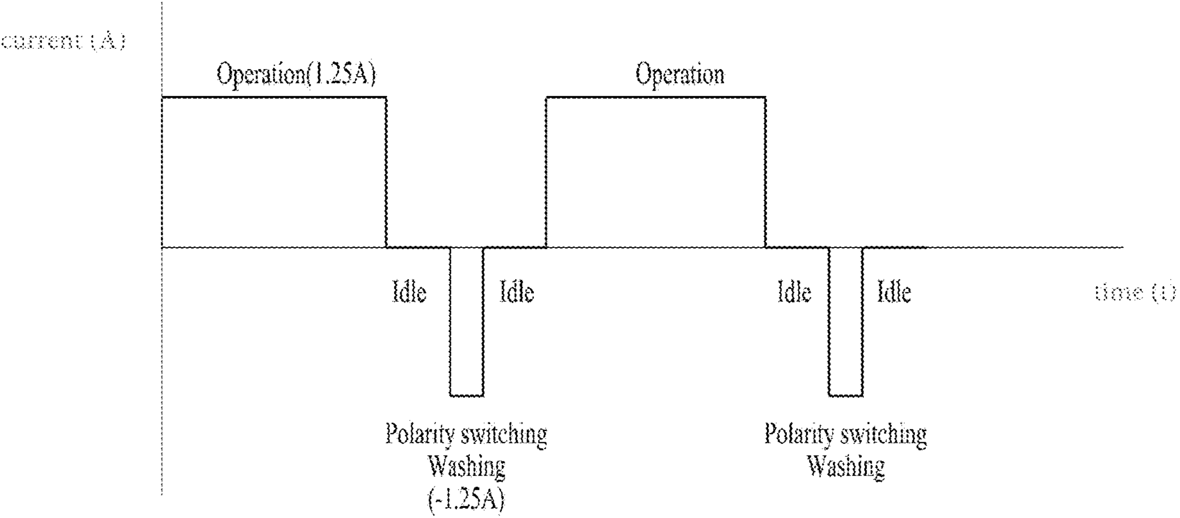
FIG. 9 is a waveform diagram showing a first operation example of the water treatment device according to one embodiment of the present disclosure.
Figure 10:
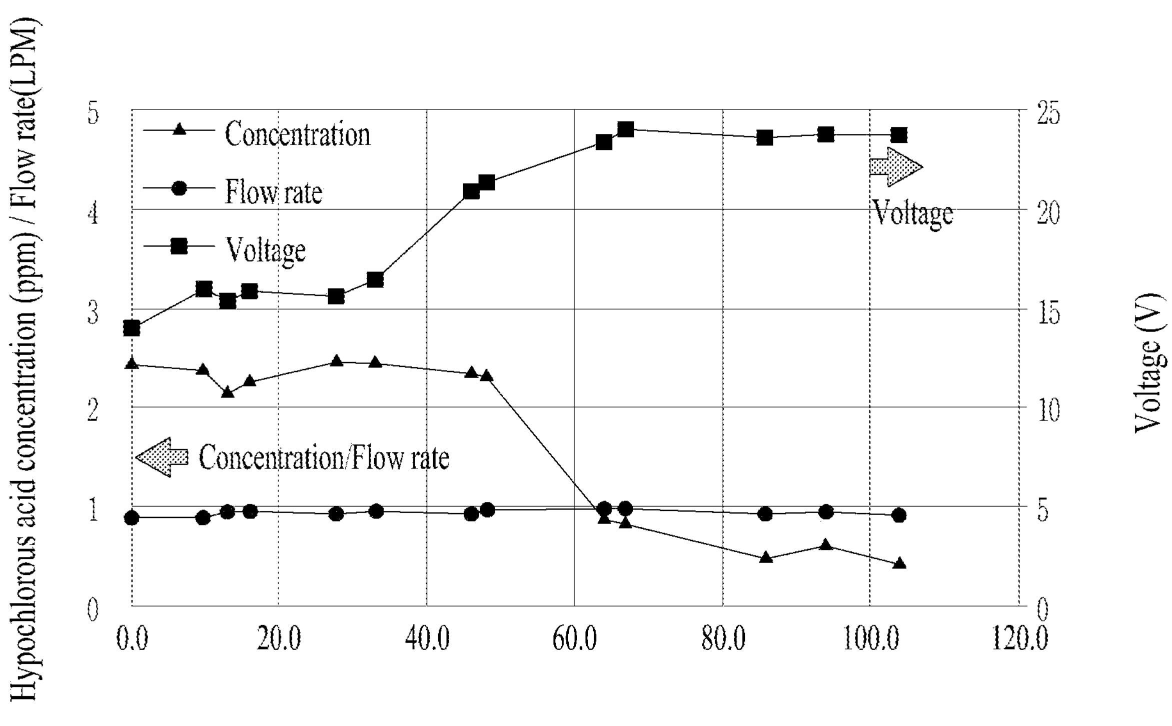
FIG. 10 is a graph showing a hypochlorous acid concentration in FIG. 9.

FIG. 9 is a waveform diagram showing a first operation example of the water treatment device according to one embodiment of the present disclosure, and FIG. 10 is a graph showing the hypochlorous acid concentration in FIG. 9.

Figure 11:
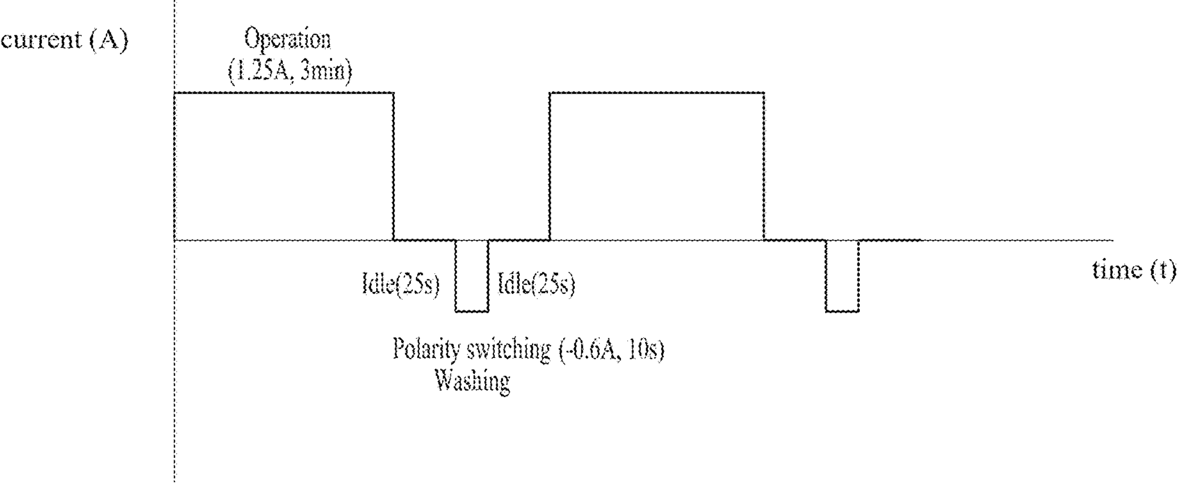
FIG. 11 is a waveform diagram showing a second operation example of the water treatment device according to one embodiment of the present disclosure.
Figure 12:
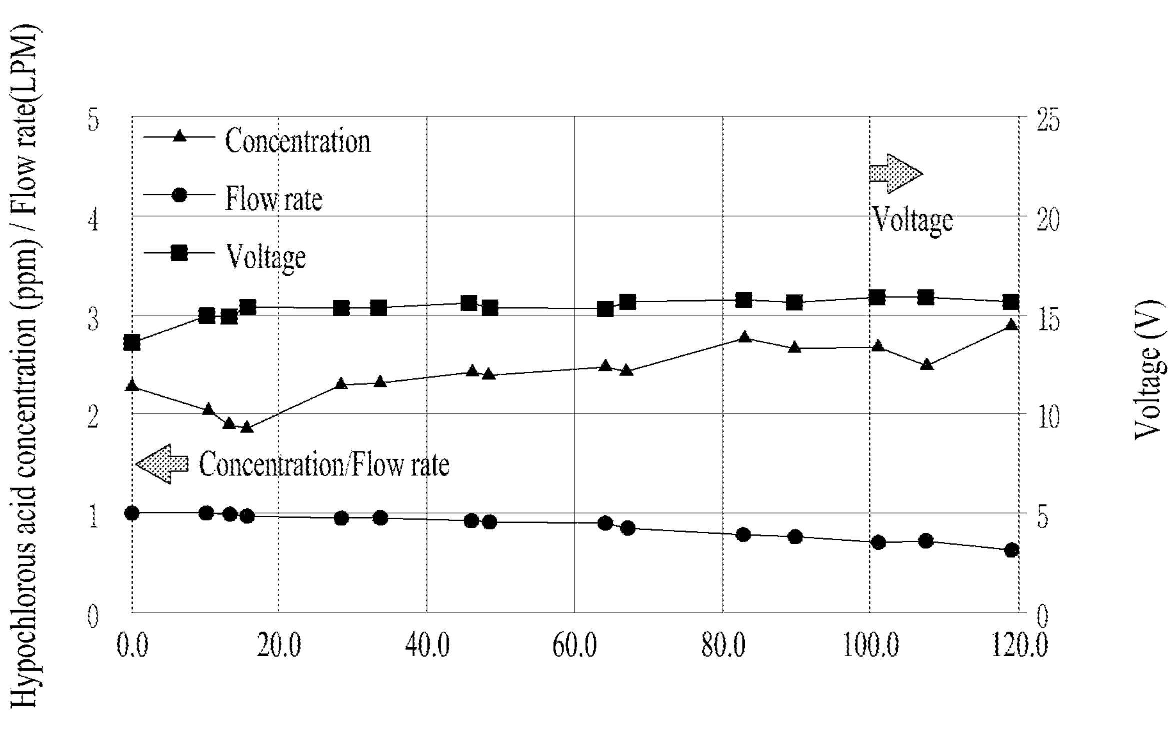
FIG. 12 is a graph showing a hypochlorous acid concentration in FIG. 11.

FIG. 11 is a waveform diagram showing a second operation example of the water treatment device according to one embodiment of the present disclosure, and FIG. 12 is a graph showing the hypochlorous acid concentration in FIG. 11.

Figure 13:
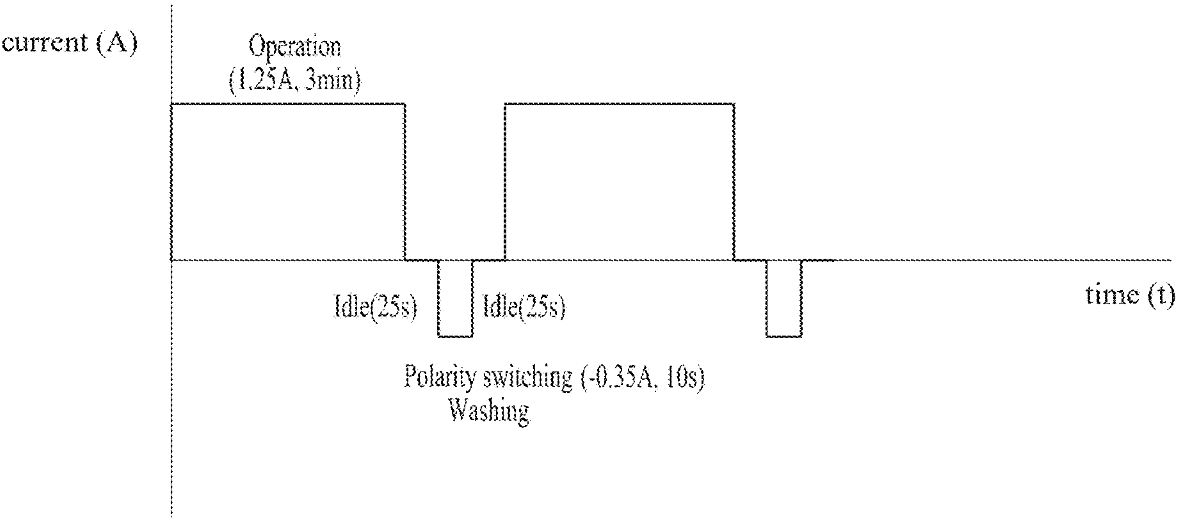
FIG. 13 is a waveform diagram showing a third operation example of a water treatment device according to one embodiment of the present disclosure.
Figure 14:
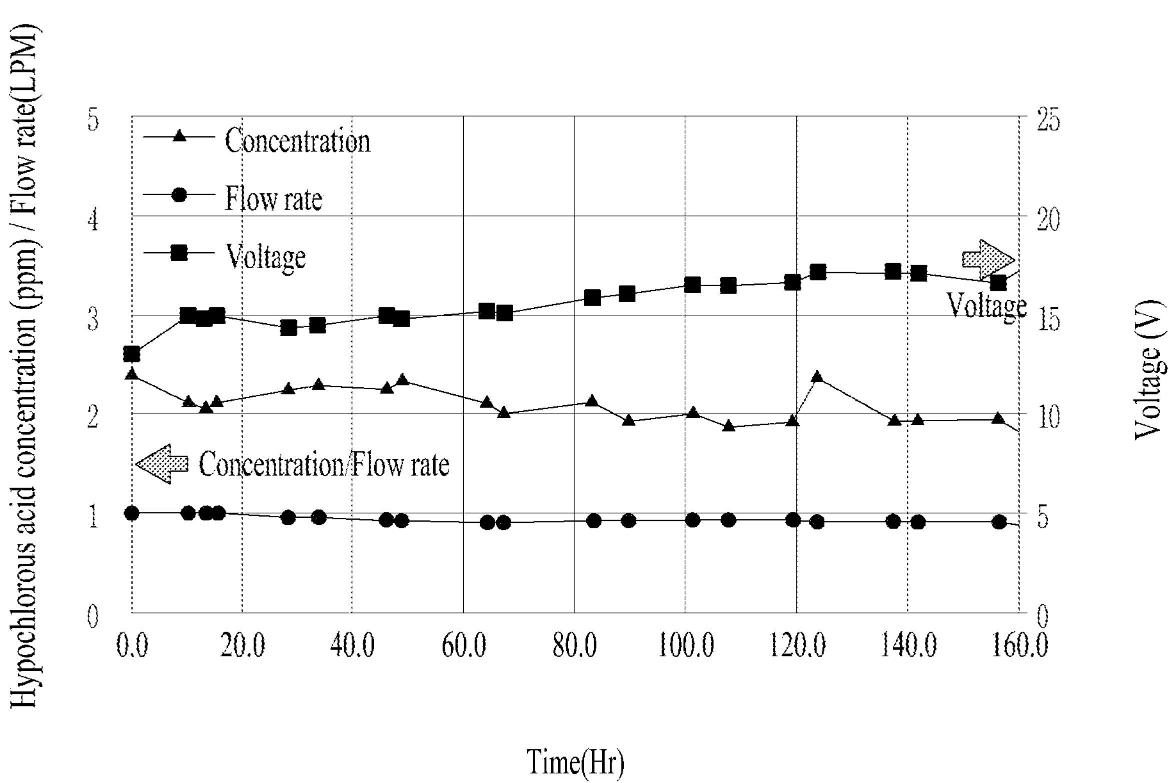
FIG. 14 is a graph showing a hypochlorous acid concentration in FIG. 13.

FIG. 13 is a waveform diagram showing a third operation example of the water treatment device according to one embodiment of the present disclosure, and FIG. 14 is a graph showing the hypochlorous acid concentration in FIG. 13.

Figure 15:
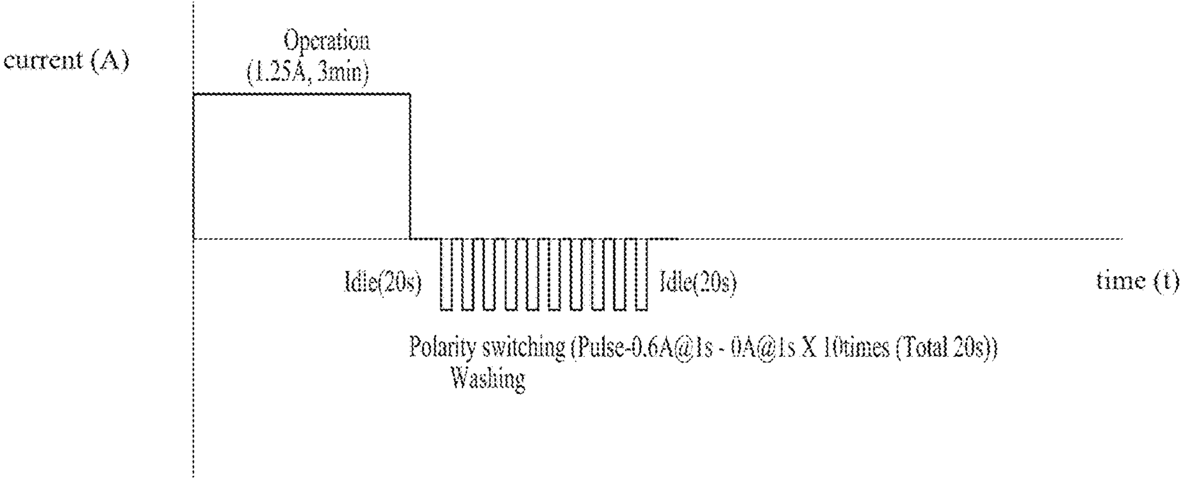
FIG. 15 is a waveform diagram showing a fourth operation example of the water treatment device according to one embodiment of the present disclosure.
Figure 16:
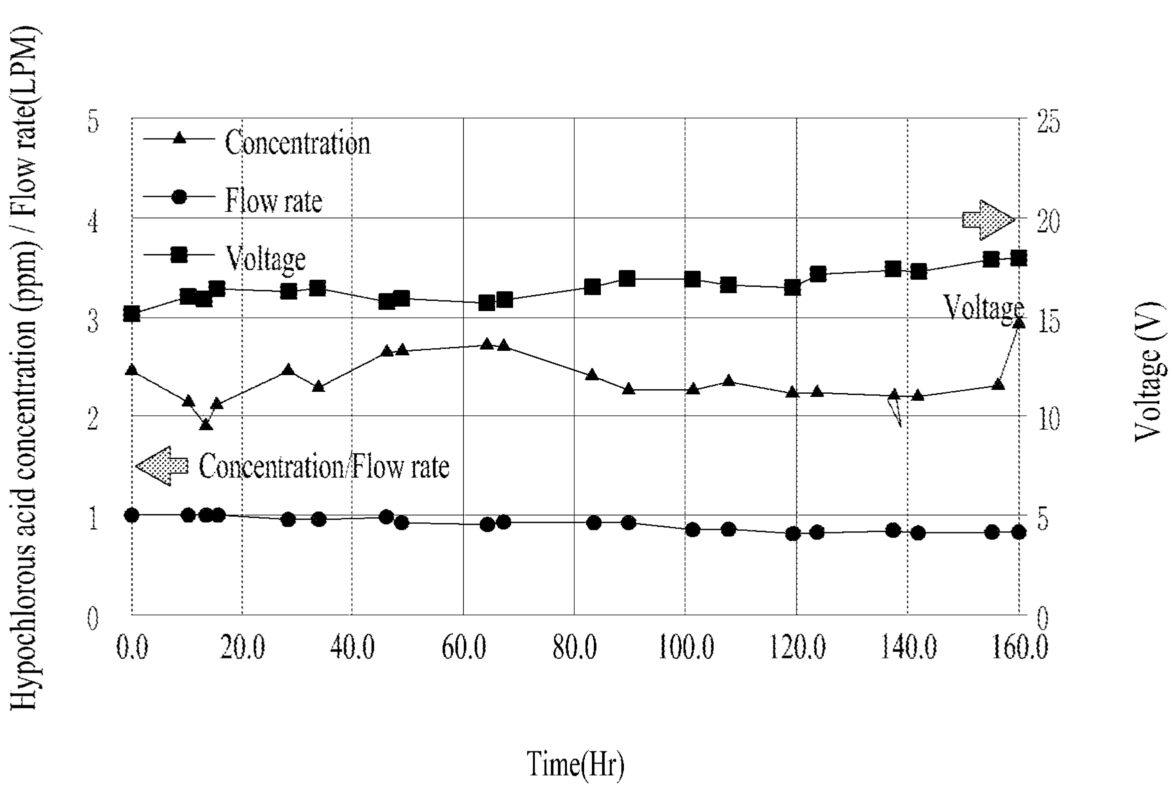
FIG. 16 is a graph showing a hypochlorous acid concentration in FIG. 15.

FIG. 15 is a waveform diagram showing a fourth operation example of the water treatment device according to one embodiment of the present disclosure, and FIG. 16 is a graph showing the hypochlorous acid concentration in FIG. 15.

Hereinafter, each operation example of the water treatment device according to one embodiment of the present disclosure and a relationship between the hypochlorous acid concentration, the flow rate and the voltage in each operation example will be briefly described with reference to FIG. 9 to FIG. 16.

First, referring to FIG. 9, when the negative potential operation is performed via the polarity switching, washing of the electrode is performed. In this case, the magnitude of the applied current in the negative potential operation is equal to that in the positive potential operation.

In one example, the operation of producing the hypochlorous acid may be executed at a current of 1.25 A, and then, the washing may be performed at current of −1.25 A via the polarity switching. In this connection, there may be an idle period before and after the polarity switching. An operation of producing the hypochlorous acid may be performed for 3 minutes, and then the idle period may occur at 0 A. Thereafter, the polarity switching may occur to perform the washing for 10 seconds, followed by an idle period of 25 seconds. The idle periods before and after the polarity switching may be symmetric with each other around the negative potential operation period.

The relationship between the hypochlorous acid concentration, the flow rate, and the voltage according to this operation example is shown in FIG. 10.

It may be identified that the concentration of hypochlorous acid is reduced to a level smaller than 1 ppm after approximately 63 hours in this operation example. Further, it may be identified that the voltage gradually increases after about 30 hours and becomes saturated after 60 hours. This increase in the voltage may be due to the hardness material.

Next, referring to FIG. 11, the electrode is washed when the negative potential operation is performed via polarity switching. In this connection, a magnitude of the applied current in the negative potential operation is smaller than that in the positive potential operation.

In one example, the operation of producing hypochlorous acid may be performed at a current of 1.25 A, and then, under the negative potential operation via the polarity switching, washing may be performed at a current (for example, −0.6 A) whose a magnitude is smaller than that of the operating current in the positive potential operation. That is, an asymmetric operation may be performed. In this connection, there may be an idle period before and after the polarity switching.

The operation of producing the hypochlorous acid may be performed for 3 minutes, and then the idle period may occur at 0 A. Thereafter, under the negative potential operation via the polarity switching, washing may be performed for 10 seconds, followed by an idle period for 25 seconds. Thus, the idle periods before and after the polarity switching may be symmetric with each other around the negative potential operation period.

In this negative potential operation period, a trace amount of hypochlorous acid may actually be produced. That is, washing may be performed mainly in the negative potential operation period.

The relationship between the hypochlorous acid concentration, the flow rate, and the voltage according to this operation example is shown in FIG. 12.

It may be identified that the concentration of hypochlorous acid does not decrease over time in this operation example. Further, the voltage may be kept at substantially the same level.

The flow rate may be slightly reduced. This may be understood as being due to the scale. However, the asymmetric operation may allow the concentration of hypochlorous acid to be maintained uniformly, the scale material to be removed from the electrode, and the damage to the electrode to be greatly reduced.

Referring to FIG. 13, the electrode is washed when the negative potential operation is performed via polarity switching, and the magnitude of the applied current in the negative potential operation is smaller than that in the positive potential operation. In this connection, the magnitude of the applied current in the negative potential operation is smaller than that in FIG. 11.

In one example, the operation of producing hypochlorous acid may be performed at a current of 1.25 A, and then, under the negative potential operation via the polarity switching, washing may be performed at a current (for example, −0.35 A) whose a magnitude is smaller than that of the operating current in the positive potential operation. That is, an asymmetric operation may be performed. In this connection, there may be an idle period before and after the polarity switching.

The operation of producing the hypochlorous acid may be performed for 3 minutes, and then the idle period may occur at 0 A. Thereafter, under the negative potential operation via the polarity switching, washing may be performed for 10 seconds, followed by an idle period for 25 seconds. Thus, the idle periods before and after the polarity switching may be symmetric with each other around the negative potential operation period.

In this negative potential operation period, a trace amount of hypochlorous acid may actually be produced. That is, washing may be performed mainly in the negative potential operation period.

The relationship between the hypochlorous acid concentration, the flow rate, and the voltage according to this operation example is shown in FIG. 14.

It may be identified that the concentration of hypochlorous acid does not decrease over time in this operation example. That is, the concentration of hypochlorous acid may be maintained at a level greater than 1 ppm for a duration larger than 160 hours. Further, the voltage may be kept at substantially the same level.

The flow rate may also be kept at substantially the same level. The asymmetric operation may allow the concentration of hypochlorous acid to be maintained uniformly, the scale material to be removed from the electrode, and the damage to the electrode to be greatly reduced.

Referring to FIG. 15, the electrode is washed when the negative potential operation is performed via polarity switching, and the magnitude of the applied current in the negative potential operation is smaller than that in the positive potential operation. Further, the current may be applied in a pulsed manner under the negative potential operation. In this connection, the magnitude of the applied current in the negative potential operation is equal to that in FIG. 13.

In one example, the operation of producing hypochlorous acid may be performed at a current of 1.25 A, and then, under the negative potential operation via the polarity switching, washing may be performed at a current (for example, −0.6 A) whose a magnitude is smaller than that of the operating current in the positive potential operation. That is, an asymmetric operation may be performed. In this connection, there may be an idle period before and after the polarity switching. Further, the current may be applied in a pulsed manner under the negative potential operation. In one example, a total of 10 pulses may be applied for 1 second. In this connection, there may be an idle period before and after the polarity switching. Each idle period may be relatively short.

The operation of producing the hypochlorous acid may be performed for 3 minutes, and then the idle period may occur at 0 A. Thereafter, under the negative potential operation via the polarity switching, washing may be performed for 10 seconds, followed by an idle period for 20 seconds. Thus, the idle periods before and after the polarity switching may be symmetric with each other around the negative potential operation period.

In this negative potential operation period, a trace amount of hypochlorous acid may actually be produced. That is, washing may be performed mainly in the negative potential operation period.

The relationship between the hypochlorous acid concentration, the flow rate, and the voltage according to this operation example is shown in FIG. 16.

It may be identified that the concentration of hypochlorous acid does not decrease over time in this operation example. That is, the concentration of hypochlorous acid may be maintained at a level greater than 1 ppm for a duration larger than 160 hours. Further, the voltage may be kept at substantially the same level.

The flow rate may also be kept at substantially the same level. The asymmetric operation may allow the concentration of hypochlorous acid to be maintained uniformly, the scale material to be removed from the electrode, and the damage to the electrode to be greatly reduced.

The above description is merely an exemplary description of the technical idea of the present disclosure. Person having ordinary knowledge in the technical field to which the present disclosure belongs may make various modifications and variations without departing from the essential characteristics of the present disclosure.

Therefore, the embodiments as disclosed in the present disclosure are intended for description of the technical idea of the present disclosure rather than limiting the technical idea of the present disclosure. Thus, the scope of the technical idea of the present disclosure is not limited by the embodiments.

The scope of protection of the present disclosure should be interpreted by the claims below, and all technical ideas within the scope equivalent thereto should be construed as being included in the scope of the present disclosure.

What is claimed is:

1. A water treatment device having a purified water and a sterilizing water producing function, the device comprising:

a filter assembly that filters foreign materials contained in raw water supplied from a water supply source;

a water supply valve located downstream of the filter assembly;

a sterilizing water producing module connected to and disposed between a first point and a second point and at a downstream of the water supply valve and having a plurality of first electrodes and a plurality of second electrodes having opposite polarities and adjacent to each other for electrolyzing the raw water to produce the sterilizing water;

a bypass path branched at a front end of the sterilizing water producing module, the bypass path bypassing the sterilizing water producing module and discharging the purified water;

a first path located at a rear end of the sterilizing water producing module, branched from the first point, and equipped with a water discharge valve that controls a discharge of the sterilizing water;

a second path located at the rear end of the sterilizing water producing module, branched from the first point, and equipped with a drain valve that controls a discharge of scale generated in the sterilizing water producing module; and a controller configured to operate by applying voltage or current to each of the first electrodes and the second electrodes of the sterilizing water producing module, wherein the first electrodes include:

a substrate metal layer forming each of the first electrodes;

a catalyst metal layer formed of oxide material on the substrate metal layer; and a protective layer disposed between the substrate metal layer and the catalyst metal layer, wherein the second electrodes are formed with a substrate metal layer for asymmetric potential operation with respect to the first electrodes, wherein the controller is configured to asymmetrically switch the polarities of each of the first electrodes and the second electrodes between a positive potential and a negative potential, thereby repeatedly driving the sterilizing water producing module in an asymmetrical positive potential operation and a negative potential operation, wherein the positive potential operation performs a first polarity-based operation for producing the sterilizing water by applying a constant voltage or current to each of the first electrodes and the second electrodes, wherein the negative potential operation performs a second polarity-based operation to remove scale from the sterilizing water producing module by applying a voltage or current lower than the constant voltage or current in the positive potential operation to each of the first electrodes and the second electrodes in a pulse form for a shorter time than the positive potential operation, wherein an idle operation is performed for washing each of the first electrodes and the second electrodes between the first polarity-based operation and the second polarity-based operation, or before and after the second polarity-based operation, and wherein the controller is configured to discharge the sterilizing water through the first path when generating sterilizing water, and discharge the scale through the second path when cleaning the scale.

2. The device of claim 1, wherein the sterilizing water is produced under the positive potential operation, wherein at least one of scale removal or washing is performed under the negative potential operation.

3. The device of claim 1, wherein washing of each of the first electrode and the second electrode is performed during each idle period.

4. The device of claim 1, wherein the catalyst metal layer includes at least one of Ru, Ir, Pt, Pd, or Rh.

5. The device of claim 1, wherein the catalyst metal layer includes at least one of Ta, Pt, Sn, or Ti.

6. The device of claim 1, wherein the substrate metal layer of the first electrodes and the second electrodes includes at least any of Ti, Ta, or an oxide thereof, or at least one of stainless steel (SUS) or Pt.

7. The device of claim 1, wherein a time duration of the idle operation is longer than a time duration of each pulse of the negative potential operation.

8. The device of claim 1, wherein a time duration of the idle operation is equal to a time duration of the negative potential operation.

9. The device of claim 1, wherein a time duration of the positive potential operation is longer than a time duration of the idle operation.

* * * * *